(12) United States Patent
Albanna et al.

(10) Patent No.: US 9,873,341 B2
(45) Date of Patent: Jan. 23, 2018

(54) TRANSFORMERLESS, CURRENT-ISOLATED ONBOARD CHARGER WITH SOLID-STATE SWITCHING CONTROLS

(71) Applicant: GM GLOBAL TECHNOLOGY OPERATIONS LLC, Detroit, MI (US)

(72) Inventors: Ahmad Albanna, Dearborn Heights, MI (US); Md Nayeem Arafat, Rancho Cucamonga, CA (US); William T. Ivan, Shelby Township, MI (US); Mohammad N. Anwar, Van Buren Township, MI (US); Mehrdad Teimorzadeh, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 365 days.

(21) Appl. No.: 14/818,911

(22) Filed: Aug. 5, 2015

(65) Prior Publication Data

US 2017/0036555 A1    Feb. 9, 2017

(51) Int. Cl.
*H02J 7/14* (2006.01)
*B60L 11/18* (2006.01)
*H02M 3/158* (2006.01)
*H02M 1/00* (2006.01)

(52) U.S. Cl.
CPC ....... *B60L 11/1812* (2013.01); *B60L 11/1816* (2013.01); *H02M 3/1582* (2013.01); *H02M 2001/007* (2013.01)

(58) Field of Classification Search
CPC ............ B60L 11/1812; B60L 11/1816; H02M 3/1582; H02M 2001/007
USPC ................................ 320/104, 140, 162, 163
See application file for complete search history.

(56) References Cited

U.S. PATENT DOCUMENTS

2014/0361742 A1* 12/2014 Chung ................ B60L 11/1812
320/109
2016/0303987 A1* 10/2016 Kawamura ......... H02M 3/3376

\* cited by examiner

*Primary Examiner* — Edward Tso
*Assistant Examiner* — Aaron Piggush
(74) *Attorney, Agent, or Firm* — Quinn IP Law

(57) ABSTRACT

An onboard charging module (OBCM), e.g., for a vehicle, is characterized by an absence of a transformer and includes an AC-to-DC voltage rectifier, DC-DC buck converter, DC-DC boost converter, DC link capacitor between the buck converter and boost converter, and solid-state devices. The devices include a diode and first and second switches having opposite open/closed switching states. The first and second switches are connected to a common rail of a DC bus, the first switch and diode are between the voltage rectifier and boost converter, and the second switch is between the link capacitor and buck converter. Third and fourth switches may be used on the opposite rail as the first and second switches. The OBCM is operable, via operation of the solid-state devices, to charge the HV-ESS via an AC power supply while maintaining current isolation. An electrical system includes the OBCM, DC bus, and HV-ESS.

20 Claims, 3 Drawing Sheets

TRANSFORMERLESS, CURRENT-ISOLATED ONBOARD CHARGER WITH SOLID-STATE SWITCHING CONTROLS

TECHNICAL FIELD

The disclosure pertains to an onboard charger that foregoes the use of a transformer and uses solid-state switching control for electrical current isolation.

BACKGROUND

Hybrid electric vehicles use high-voltage batteries to power one or more electric machines and thereby deliver torque to the vehicle's driveline, either alone or in conjunction with an internal combustion engine. The term "plug-in vehicle" describes any vehicle, e.g., battery electric, hybrid electric, for instance by plugging a charging cable from the vehicle into a 120 VAC or 240 VAC wall socket. Regenerative braking may be used to recharge the battery when the vehicle is in operation.

An onboard charging module or OBCM may be used to facilitate recharging of the high-voltage battery. A typical OBCM has the required electronic circuit hardware and control software to convert single-phase or three-phase, alternating current (AC) grid voltage into a direct current (DC) voltage usable by the battery, and thus acts as a voltage rectifier. An OBCM not only increases the power factor of the rectified voltage but also boosts the rectified voltage magnitude, and thus acts as a boost converter. Additionally, the OBCM acts as a DC-DC converter to further regulate the DC voltage as needed when charging the battery.

An OBCM is described as being either an isolated design or a non-isolated design. In an isolated design of the type suitable for use in vehicles having an electric powertrain, galvanic isolation is maintained between the input and output sides of the OBCM. A transformer is a suitable galvanic isolator, as is well known in the art, as is any device that interconnects two electrical circuits without allowing electricity to flow directly from one electrical circuit to the other. In contrast, non-isolated OBCM designs lack galvanic isolation. As a result, non-isolated designs tend to be used most often in low voltage, non-vehicular designs.

SUMMARY

An onboard charging module (OBCM) is disclosed herein for charging a high-voltage energy storage system (HV-ESS) in an electrical system, e.g., of a plug-in vehicle of any of the types described above, or in any other electrical system requiring the recharging of a DC battery using an offboard polyphase power supply. The OBCM described herein is characterized by an absence of a transformer of the type often used to provide galvanic isolation. That is, the OBCM is "transformerless" as that term is used herein. However, ground fault current isolation is still maintained in the present design via the use of additional solid-state devices, including specifically-positioned/connected and controlled semiconductor switches and a diode. When used in conjunction with existing electronic hardware of the OBCM, the switches and diode provide two-stage energy conversion/transfer to thereby charge the HV-ESS. The example circuit topologies described herein are intended to provide cost, weight, and packaging space reduction benefits via a transformerless design while still providing current isolation.

The semiconductor switches of the solid-state devices may be embodied variously as two, three, or four semiconductor switches in different example embodiments. Optionally, the semiconductor switches may be silicon carbide (SiC) switches or wide-band gap (WBG) switches, both of which are known in art to provide certain performance advantages relative to IGBTs and MOSFETs. However, in some applications satisfactory results may be obtained using IGBTs, MOSFETs, or other suitable solid-state switches.

In a particular embodiment, an OBCM is disclosed for use with an AC power supply and an HV-ESS electrically connected to a DC voltage bus having positive and negative rails. The OBCM includes an AC-to-DC voltage rectifier connectable to the AC power supply and to the rails of the DC voltage bus. The rectifier is also connected to a DC-DC buck converter of the OBCM. A DC-DC boost converter, operable for increasing a DC voltage input to the buck converter, is connected between the voltage rectifier and the buck converter. The OBCM also includes a link capacitor in electrical parallel with the buck and boost converters. The link capacitor, which is electrically connected between the converters, is operable for providing the increased DC voltage input to the buck converter.

The set of solid-state devices of the OBCM includes a diode as well as first and second semiconductor switches, with the switches having opposite open/closed switching states. The first switch and the diode are electrically connected between the voltage rectifier and the boost converter. The second switch is electrically connected between the link capacitor and the buck converter. The OBCM is operable, via control of the solid-state devices, to selectively charge the HV-ESS using the AC power supply while maintaining electrical current isolation of the OBCM without the use of a transformer in the conventional manner.

An electrical system is also disclosed that includes a DC voltage bus, the HV-ESS which is electrically connected to the DC voltage bus, and the OBCM noted above. The OBCM is electrically connected to the HV-ESS via the DC voltage bus.

Also disclosed herein is a vehicle that, in an example embodiment, includes the HV-ESS, a transmission having an input member, an electric machine connected to the input member, an AC voltage bus, the DC voltage bus, and a power inverter module that is electrically connected to both the HV-ESS via the DC voltage bus and to the electric machine via the AC voltage bus.

The above features and advantages and other features and advantages of the present disclosure are readily apparent from the following detailed description of the best modes for carrying out the disclosure when taken in connection with the accompanying drawings.

DETAILED DESCRIPTION

Figure 1:
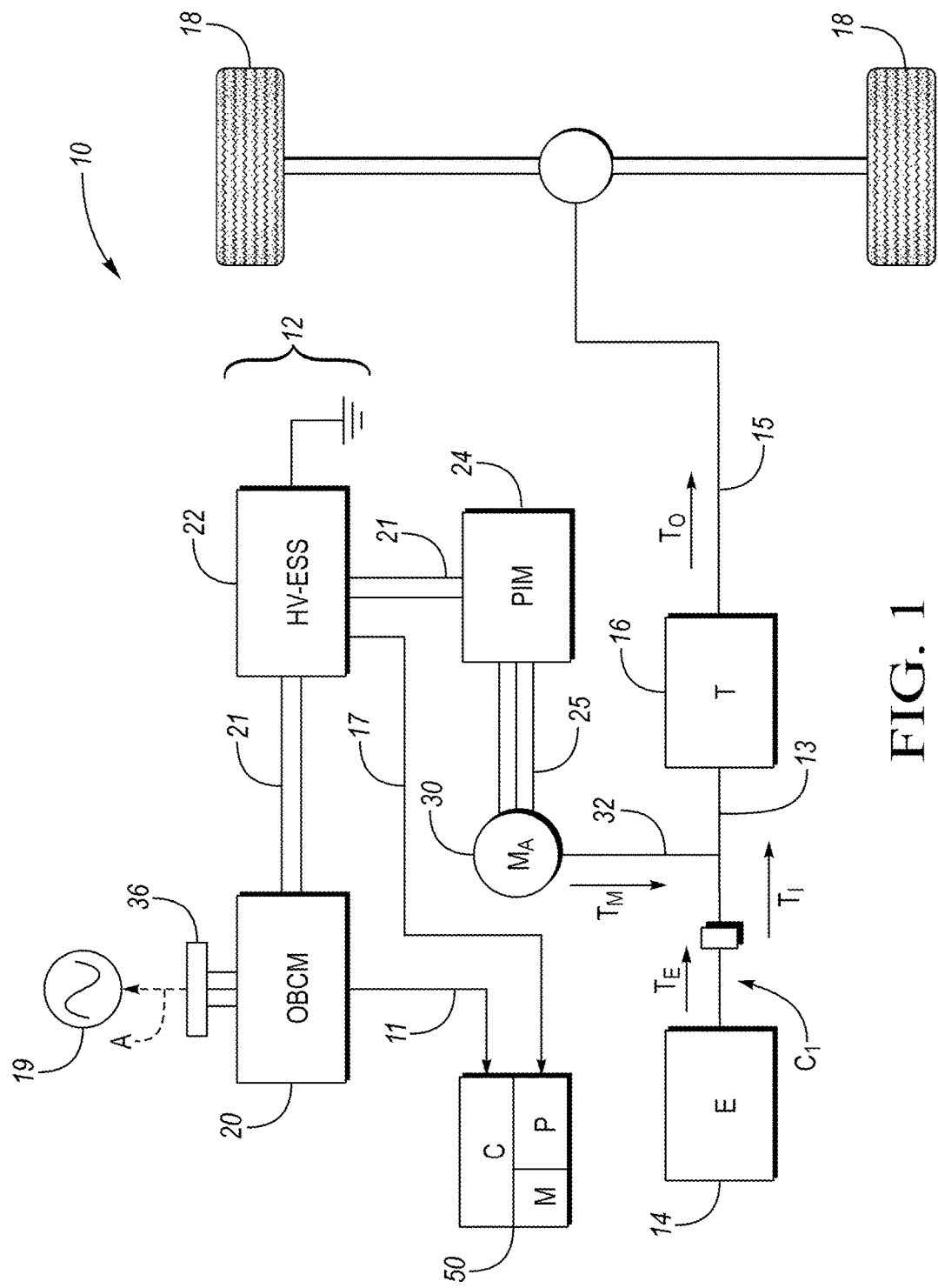
FIG. 1 is a schematic side view illustration of an example vehicle having an electrical system with a tranformerless, galvanically-isolated onboard charging module (OBCM) constructed as described herein.

Referring to the drawings, wherein like numerals indicate like components throughout the several views, an example vehicle 10 is depicted in FIG. 1. The vehicle 10 includes an electrical system 12 having an onboard charging module (OBCM) 20 and a high-voltage energy storage system (HV-ESS) 22, with the OBCM 20 being operable for electrically charging the HV-ESS 22 as set forth below. The OBCM 20 is plugged into an external polyphase/alternating current (AC) power supply 19, e.g., a 120 VAC or 240 VAC conventional wall outlet, via a charging port 36 as indicated by arrow A. In this manner, charging of the HV-ESS 22 is enabled when the vehicle 10 is not in operation, such as when the vehicle 10 is parked at a charging station or in a garage.

Figure 2:
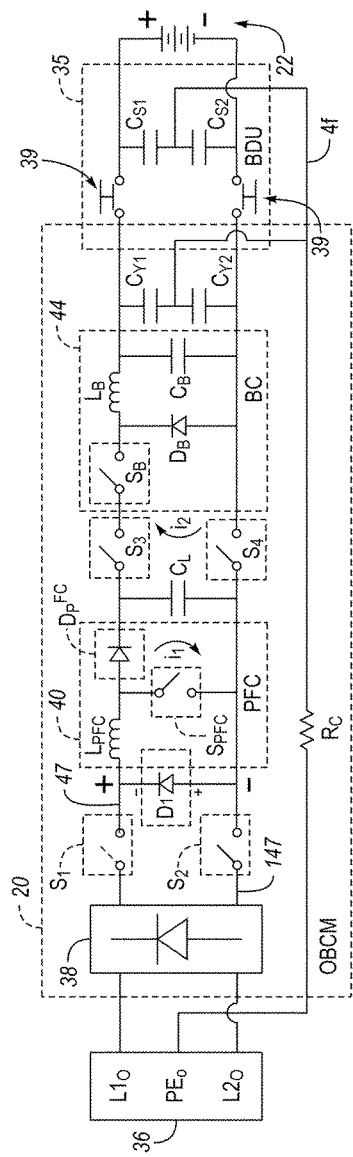
FIG. 2 is a schematic circuit diagram of an example OBCM usable in systems such as the vehicle of FIG. 1.

The OBCM 20 is automatically controlled via switching control signals (arrow 11) from a controller 50 to establish one of two charging stages of the OBCM 20, i.e., a first state charging a DC link capacitor ($C_L$), as shown in FIG. 2, in preparation for charging of the HV-ESS 22, and a second state in which a stored charge from the DC link capacitor ($C_L$) is released to the HV-ESS 22. Example transformerless circuit topologies for achieving the desired functionality are described in more detail below with reference to FIG. 2, and with additional reference to the time plots of FIGS. 3A-4B.

The vehicle 10 shown in FIG. 1, which is an automotive passenger vehicle, is one type of higher-level system that may use the electrical system 12 and benefit from use of the disclosed OBCM 20. However, the OBCM 20 may be used with any electrical system 12, vehicular or otherwise, in which the charging of a DC battery or other suitable energy storage system is desired. High-voltage applications, which as used herein refer, by way of example, to voltage levels in excess of 20 VDC, may especially benefit from the present approach due to the need for electrical current isolation.

In addition to the OBCM 20 and the HV-ESS 22, the electrical system 12 of FIG. 1 may include a power inverter module (PIM) 24, i.e., a power inverter having the requisite IGBTs or other semiconductor devices needed for converting AC voltages to DC voltages and vice versa, e.g., via pulse width modulation or other suitable switching techniques. The electrical system 12 may also include an auxiliary power module and a low-voltage energy storage system (LV-ESS), neither of which are shown but both of which are well known in the art. The OBCM 20 may be electrically connected to the HV-ESS 22, and the HV-ESS 22 to the PIM 24, via a high-voltage DC bus 21. As used herein, "high-voltage" is a relative term typically referring to voltage levels in excess of 12-15 VDC auxiliary voltage levels. Thus, 18-20 VDC may define a reasonable lower limit of high-voltage for some applications, with voltage levels of 30 VDC to 300 VDC or more being possible in plug-in vehicle applications depending on the design.

Also as used herein, the term "module" refers to the combined physical hardware and control software used to implement a designated function of a particular device. Such hardware maybe housed together for a given module. For instance, the PIM 24 may include all necessary semiconductor switches, responsive to pulse width modulation signals, needed to convert AC source power aboard the vehicle 10 to DC power and vice versa, with AC power delivered by the PIM 24 to phase leads 25 of a three-phase or other polyphase electric machine ($M_A$) 30. The OBCM 20 in turn includes a variety of electronic circuit components as explained in further detail below with reference to FIG. 2.

When excited by an electrical current via the phase leads 25, the electric machine 30 delivers motor output torque (arrow $T_M$) via a rotor shaft 32 to an input member 13 of a transmission 16. In some embodiments, an internal combustion engine (E) 14 may be used as an additional power source, for instance in a plug-in hybrid electric vehicle design, to deliver engine torque (arrow $T_E$) as part of an input torque (arrow $T_I$) to the transmission 16 via an input clutch C1, e.g., a hydrodynamic torque converter or a friction clutch and damper assembly, or the engine 14 may be dispensed with altogether in a battery electric vehicle. Alternatively, the engine 14 may be connected to a generator (not show) in an extended-range electric vehicle design, with the engine 14 in such a design being disconnected from the driveline. One or more additional electric machines (not shown) may be used in other designs, e.g., to deliver motor torque to a final drive unit or to an output member 15 of the transmission 16, without output torque (arrow $T_O$) from the transmission 16 ultimately powering a set of road wheels 18 to propel the vehicle 10.

The controller 50 of FIG. 1 may be embodied as a unitary or distributed control unit in electrical communication with the OBCM 20 over suitable communication channels and/or transfer conductors, with the OBCM 20 responsive to the control signals (arrow 11) from the controller 50 as noted above. The controller 50 may be one or more digital computers having sufficient memory (M) and a processor (P), with the memory (M) programmed with instructions for a switching sequence to the OBCM 20. Memory (M) includes tangible, non-transitory memory devices or media such as read only memory, random access memory, optical memory, flash memory, electrically-programmable read-only memory, and the like. The control signals (arrow 11) ultimately determine a duty cycle of the OBCM 20 suitable for recharging the HV-ESS 22. Charging control values (arrow 17) may be read by or reported to the controller 50 describing a current state of the HV-ESS 22, e.g., a state of charge, temperature, current, individual cell voltages, and the like, so as to better enable the controller 50 to determine when and how to control the OBCM 20.

Referring to FIG. 2, an example circuit topology is shown to depict possible embodiments of the OBCM 20 shown schematically in FIG. 1. The OBCM 20 is electrically connected to the polyphase power supply 19 of FIG. 1 via the charging port 36, which has three electrical leads L1, L2, and PE. As is well known in the art, ground fault current/circuit interrupt or GFCI devices are used to protect against ground faults in an electrical circuit. An input current at electrical lead L1 is compared at electrical lead PE to an output current at electrical lead L2. The root mean square (RMS) value of the difference in electrical currents at leads L1 and L2 is compared to a low threshold, e.g., 6 mA. The electrical circuit is broken within the charging port 36 if this threshold is exceeded. Such GFCI detection functionality is retained in the electrical circuit topology shown in FIG. 2.

The OBCM 20 includes a voltage rectifier 38, e.g., a diode bridge, that rectifies AC line power provided via the charging port 36. Thereafter, a power factor correction (PFC) block 40, i.e., a DC-DC boost converter of the type known in the art, having a first plurality of electronic components, depicted as an inductor $L_{PFC}$, forward-biased diode $D_{PFC}$, and a semiconductor switch $S_{PFC}$, collectively operable for increasing a DC voltage output of the voltage rectifier 38 to levels suitable for charging a DC link capacitor $C_L$. The OBCM 20 also includes a buck converter (BC) 44, which as known in the art is a solid-state device operable for decreasing a DC voltage by operation of a second plurality of electronic devices, shown as another semiconductor switch $S_B$, a diode $D_B$, an inductor $L_B$, and a capacitor $C_B$. The reduced voltage output from the buck converter 44 is then delivered to a capacitor block Cy1, Cy2 and to additional capacitors $C_{S1}$, $C_{S2}$ of a battery disconnect unit (BDU) 35. The capacitor block Cy1, Cy2 and capacitors $C_{S1}$, $C_{S2}$ are electrically connected to the electrical lead PE of the charge port 36 as shown, with the equivalent resistance of cables or other physical conductors used for this purpose represented by a resistor $R_C$. The BDU 35 has electrical contactors 39 disposed between the capacitor block Cy1, Cy2 and the HV-ESS 22, with vehicle conditions such as vehicle ignition being off and certain electrical faults resulting in automatic and rapid disconnection of the HV-ESS 22 via opening of the contactors 39.

Within the circuit topology shown in FIG. 2, solid-state hardware is added to existing hardware typically found in any OBCM. In an embodiment, the additional hardware includes at least two solid-state switches, i.e., the solid-state switches $S_2$ and $S_4$ shown at the bottom of FIG. 2, arranged on a common rail of the DC voltage bus as shown, e.g., both on the positive rails 47, and a diode $D_1$ arranged between the positive and negative rails 47, 147 in parallel with the boost converter 40. The solid-state switches $S_2$ and $S_4$ have opposite open/closed switch states, i.e., when the switch $S_2$ is open the switch $S_4$ is closed and vice versa. In such an embodiment, the switch $S_2$ is closed via operation of the controller 50 to charge the DC link capacitor $C_L$. The switch $S_4$ remains open while this occurs. When the DC link capacitor $C_L$ is fully charged, the switch $S_2$ is opened and the switch $S_4$ is closed, with the closing of the switch $S_4$ generally but not precisely coinciding with closure of the buck switch $S_B$ of buck converter 44. In this manner, an accumulated charge across the DC link capacitor $C_L$ is delivered to the HV-ESS 22.

The embodiment of FIG. 2 using the solid-state switches $S_2$ and $S_4$ may be modified with an optional additional solid-state switch $S_1$ on the positive rail 47, or with a pair of additional solid-state switches $S_1$ and $S_3$. For instance, in designs in which the hardware of the boost converter 40 and buck converter 44 is already in place, benefits of the present design may still be enjoyed via addition of four solid-state switches $S_1$, $S_2$, $S_3$, and $S_4$ along with the diode $D_1$ at the points depicted in FIG. 2. The controller 50 can be programmed to control the switches $S_1$, $S_2$, $S_3$, and $S_4$ without affecting or changing control of the internal switch $S_{PFC}$ of the boost converter 40 or the switch $S_B$ of the buck converter 44.

The solid-state switches $S_1$, $S_2$, $S_3$, and $S_4$ may be embodied as semiconductor switches providing high-speed, high-power switching. The switches $S_1$, $S_2$, $S_3$, and $S_4$ may be optionally embodied as silicon carbide (SiC) switches or wide band gap (WBG) switches. MOSFETs or IGBTs may be used in other embodiments, with each switch type providing distinct cost/performance tradeoffs as is known in the art.

The diode $D_1$ is connected in electrical parallel with the switch $S_{PFC}$ of the boost converter 40, with the cathode of diode $D_1$ connected to the inductor $L_{PFC}$ and anode of a diode $D_{PFC}$ of the boost converter 40. Thus, the link capacitor $C_L$ is in electrical parallel with the diode $D_1$. When the switch $S_2$ is closed, electrical current flows in a loop through the diode $D_{PFC}$ such that voltage builds across the link capacitor $C_L$ as indicated by arrow $i_1$. When the switches $S_3$ and $S_4$ are closed and the switch $S_2$ is opened, electrical current flows in a loop to the boost capacitor $C_B$ as indicated by arrow $i_2$, so that the stored charge is delivered from the link capacitor $C_L$ to the HV-ESS 22.

Alternatively, one may forego use of the solid-state switch $S_3$ and rely on control of the existing buck switch $S_B$ of the buck converter 44, which generally opens and closes under the same conditions used for the switch $S_3$ and thus may be used to the exclusion of switch $S_3$. Likewise, the switch $S_{PFC}$ of the boost converter 40 may be used to the exclusion of switch $S_2$ to arrive at a simplified circuit that may provide performance advantages. Due to the reliance of the existing switches $S_{PFC}$ and $S_B$, however, such a design may be more conductive to newly designed systems having the ability to program control of the switches $S_{PFC}$ and $S_B$ into overall control logic of the OBCM 20.

Figure 3A:
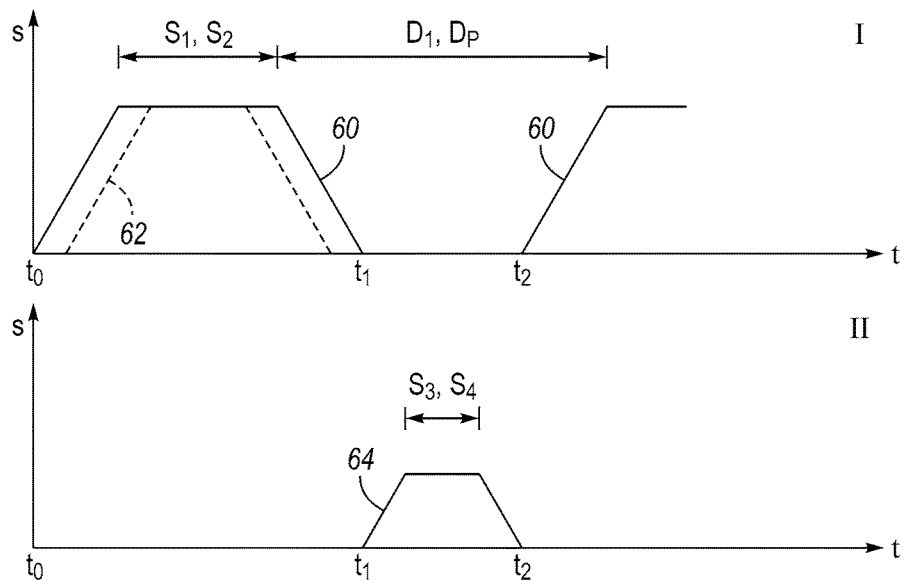
FIGS. 3A-3B are time plots of corresponding switching states of the solid-state devices shown in the circuit diagram of FIG. 2, with time depicted on the horizontal axis and switching state depicted on the vertical axis.
Figure 3B:
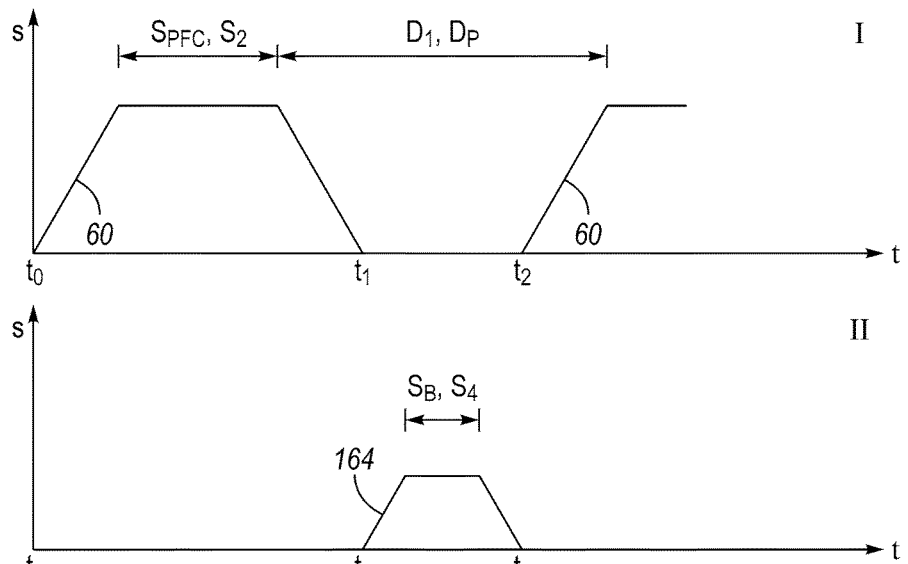

FIGS. 3A and 3B depict time plots for the circuit topologies in which solid-state switches $S_1$, $S_2$, $S_3$, and $S_4$ are used (FIG. 3A) and in which only the switches $S_2$ and $S_4$ are used (FIG. 3B). Trace 60 depicts the switching state of switches $S_1$ and $S_2$, both on from $t_0$ to $t_1$ and off from $t_1$ to $t_2$ in a first stage of operation (I), with the diodes $D_1$ and $D_P$ of FIG. 2 conducting. In the first stage of operation (I) of FIG. 3B, trace 60 depicts the switching state of switches $S_{PFC}$ and $S_2$, both on from $t_0$ to $t_1$ and off from $t_1$ to $t_2$, with the diodes $D_1$ and $D_P$ conducting.

In a $2^{nd}$ stage of operation (II) of FIG. 3A, the switches $S_3$ and $S_4$ are closed/on between $t_1$ and $t_2$ as indicated by trace 64, and the switches $S_1$ and $S_2$ are open/off, while in the $2^{nd}$ stage of FIG. 3B the switches $S_B$ and $S_4$ are closed/on and the switches $S_{PFC}$ and $S_2$ are open/off as indicated by trace 164. Trace 62 of FIG. 3A depicts the state of switch $S_{PFC}$, which as shown is on for a shorter duration than for switches $S_1$ and $S_2$, thus providing a less optimal level of current isolation than the embodiment of FIG. 3B in which the switches $S_2$ and $S_4$ are used without switches $S_1$ and $S_3$. For certain applications, however, in which existing hardware and software is used, the use of the less optimal topologies may be a more desirable option.

Figures 4A, 4B:
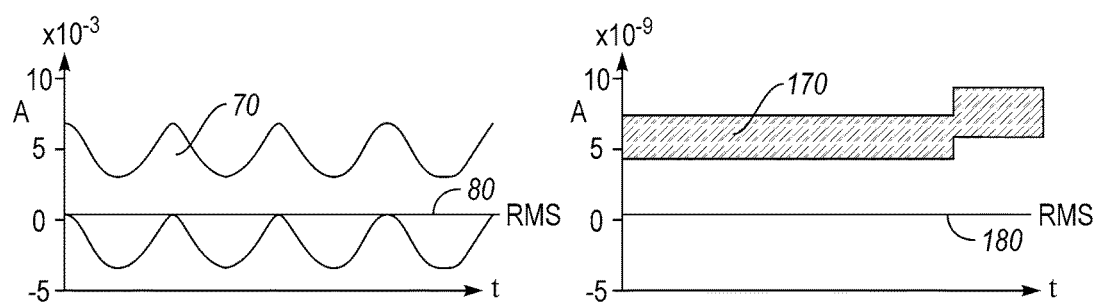
FIGS. 4A-4B are time plots of instantaneous ground fault current and root mean square (RMS) current for different embodiments of the example circuit shown in FIG. 2, with time depicted on the horizontal axis and the ground fault current depicted on the vertical axis.

Referring to FIGS. 4A and 4B, example simulated results are depicted for a circuit topology in which all of the solid-state switches $S_1$, $S_2$, $S_3$, and $S_4$ are used (FIG. 4A) and a simplified embodiment in which only the switches $S_2$ and $S_4$ are used (FIG. 4B), with FIGS. 4A and 4B corresponding to FIGS. 3A and 3B, respectively. In FIGS. 4A-4B, time (t) is plotted on the horizontal axis and current (A) on the vertical axis, with current depicted on the milliamp (mA) scale in FIG. 4A and on the nanoamp (nA) scale in FIG. 4B to contrast differences in GFCI performance of the two topologies.

In FIGS. 4A-4B, areas 70 and 170 represent the instantaneous difference in current (A) between electrical leads L1 and L2 of FIG. 2. Lines 80 and 180 represent the RMS current. For GFCI, the RMS value is compared to a low threshold, e.g., 6 mA, and a GFCI fault is present when the RMS value exceeds this level. While the RMS value is below such a threshold in FIG. 4A, the RMS value can be reduced to zero, effectively, as shown in FIG. 4B by the topology of FIG. 2 in which only the switches $S_2$ and $S_4$ are used.

As shown in FIG. 3A, the use of the solid-state switch $S_1$, due to the difference in duty cycle relative to the boost switch $S_{PFC}$ of the boost converter 40, can result in a higher current level flowing through the equivalent resistor $R_C$ of FIG. 2, i.e., the return cable and other intervening hardware or conductor structure. As the switch $S_1$ is eliminated in the primary topology of FIG. 2, leaving only switches $S_2$ and $S_4$ in addition to previously existing switch $S_{PFC}$ and $S_B$, the result is a lower RMS value.

Using the above-described circuit topologies, the controller 50 is able to first control the OBCM 20 of FIGS. 1 and 2 in a boost mode with the solid-state switches $S_1$ and $S_2$ both closed and the switches $S_3$ and $S_4$ both open, and then close the switches $S_3$ and $S_4$ while opening the switches $S_1$ and $S_2$ to thereby charge the HV-ESS 22. The controller 50 can automatically adjust the duty cycle of the various solid-state switches $S_1$, $S_2$, $S_3$, $S_4$ to charge the HV-ESS 22 with constant current and voltage, doing so based on the feedback provides to the controller 50 via the control values (arrow 17) noted above. In this manner, the cost, mass, and packaging space of transformers of the type conventionally used for magnetic isolation may be dispensed with without disturbing current isolation requirements, and with only minor modifications to existing circuit hardware and software.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An onboard charging module (OBCM) for use with an alternating current (AC) power supply and a direct current (DC) high-voltage energy storage system (HV-ESS), wherein the HV-ESS is connected to a DC voltage bus, the OBCM comprising:
   an AC-to-DC voltage rectifier connectable to the AC power supply and connected to the DC voltage bus, wherein the AC-to-DC voltage rectifier is operable for producing a rectified DC voltage output;
   a DC-DC boost converter electrically connected to the AC-to-DC voltage rectifier, and having a first plurality of electronic components collectively operable for increasing the rectified voltage output;
   a DC-DC buck converter electrically connected to the DC-DC boost converter, and having a second plurality of electronic components collectively operable for decreasing a voltage output of the boost converter;
   a link capacitor electrically connected between the buck converter and the boost converter; and
   a set of solid-state devices, including a diode and first and second switches having opposite open/closed switching states, wherein the first and second switches are connected to a common rail of the DC voltage bus, the first switch and the diode are electrically connected between the voltage rectifier and the boost converter, and the second switch is electrically connected between the link capacitor and the buck converter;
   wherein the OBCM is characterized by an absence of a transformer, and is operable, via operation of the set of solid-state devices, to selectively charge the HV-ESS via the AC power supply while maintaining current isolation within the OBCM.

2. The OBCM of claim 1, further comprising a controller programmed to control the switching state of the first and second switches via switching control signals.

3. The OBCM of claim 1, wherein the boost converter includes an additional switch, and wherein the diode is in electrical parallel with the additional switch of the boost converter.

4. The OBCM of claim 1, wherein the first and second switches are silicon carbide (SiC) switches.

5. The OBCM of claim 1, wherein the first and second switches are wide-band gap (WBG) switches.

6. The OBCM of claim 1, wherein the set of solid-state devices includes a third switch in electrical parallel with the first switch and having the same switching state as the first switch, with the first and third switches being electrically connected on respective positive and negative rails of the DC voltage bus.

7. The OBCM of claim 6, wherein the set of solid-state devices includes a fourth switch in electrical parallel with the second switch between the DC-DC boost converter and the DC-DC buck converter and having the same switching state as the second switch, with the second and fourth switches being electrically connected on the respective positive and negative rails of the DC voltage bus.

8. The OBCM of claim 1, further comprising a capacitor bank in electrical parallel with the buck converter on an output side of the buck converter.

9. An electrical system connectable to an alternating current (AC) power supply, the electrical system comprising:
   a direct current (DC) voltage bus;
   a high-voltage energy storage system (HV-ESS) electrically connected to the DC voltage bus; and
   an onboard charging module (OBCM) electrically connected to the HV-ESS via the DC voltage bus, and including:
      an AC-to-DC voltage rectifier connectable to the AC power supply and connected to the DC voltage bus, and operable for producing a rectified DC voltage output;
      a DC-DC boost converter electrically connected to the voltage rectifier, and having a first plurality of electronic components collectively operable for increasing the rectified DC voltage output;
      a DC-DC buck converter electrically connected to the boost converter, and having a second plurality of electronic components collectively operable for decreasing a voltage output of the boost converter;
      a link capacitor electrically connected between the buck converter and the boost converter; and
      a set of solid-state devices, including a diode and first and second switches having opposite open/closed switching states, wherein the first and second switches are connected to a common rail of the DC voltage bus, the first switch and the diode are electrically connected between the voltage rectifier and the boost converter, and the second switch is electrically connected between the link capacitor and the buck converter;
      wherein the OBCM is characterized by an absence of a transformer, and is operable, via operation of the set of solid-state devices, to selectively charge the HV-ESS using the AC power supply while maintaining current isolation within the OBCM.

10. The electrical system of claim 9, further comprising a controller programmed to control the switching state of the first and second switches via switching control signals.

11. The electrical system of claim 9, wherein the boost converter includes an additional switch, and wherein the diode is in electrical parallel with the additional switch of the boost converter.

12. The electrical system of claim 9, wherein the first and second switches are silicon carbide (SiC) switches.

13. The electrical system of claim 9, wherein the first and second switches are wide-band gap (WBG) switches.

14. The electrical system of claim 9, wherein the set of solid-state devices includes a third switch in electrical parallel with the first switch and having the same switching state as the first switch, with the first and third switches being electrically connected on respective positive and negative rails of the DC voltage bus.

15. The electrical system of claim 9, wherein the set of solid-state devices includes a fourth switch in electrical parallel with the second switch between the boost converter and the buck converter and having the same switching state as the second switch, with the second and fourth switches being electrically connected on the respective positive and negative rails of the DC voltage bus.

16. The electrical system of claim 9, further comprising a capacitor bank in electrical parallel with the buck converter on an output side of the buck converter.

17. The electrical system of claim 9, further comprising an AC voltage bus, a power inverter module (PIM) that is electrically connected to the HV-ESS via the DC voltage bus, and an electric machine that is electrically connected to the PIM via the AC voltage bus.

18. The electrical system of claim 17, wherein the electric machine is a traction motor operable for delivering output torque to a vehicle transmission.

19. A vehicle comprising:
a high-voltage energy storage system (HV-ESS);
a transmission having an input member;
an electric machine connected to the input member;
an alternating current (AC) voltage bus;
a direct current (DC) voltage bus;
a power inverter module (PIM) that is electrically connected to the HV-ESS via the DC voltage bus, and to the electric machine via the AC voltage bus;
an onboard charging module (OBCM) that is electrically connected to the HV-ESS via the DC voltage bus, and including:
an AC-to-DC voltage rectifier connectable to the AC power supply and connected to the DC voltage bus, and operable for producing a rectified DC output voltage;
a DC-DC boost converter electrically connected to the voltage rectifier, and having a first plurality of electronic components collectively operable for increasing the rectified DC output voltage;
a DC-DC buck converter electrically connected to the boost converter, and having a second plurality of electronic components collectively operable for decreasing the output voltage of the boost converter;
a link capacitor electrically connected between the buck converter and the boost converter;
a set of solid-state devices, including a diode and first and second switches having opposite open/closed switching states, wherein the first and second switches are connected to a common rail of the DC voltage bus, the first switch and the diode are electrically connected between the voltage rectifier and the boost converter, and the second switch is electrically connected between the link capacitor and the buck converter;
wherein the OBCM is characterized by an absence of a transformer, and is operable, via operation of the set of solid-state devices, to selectively charge the HV-ESS using the AC power supply while maintaining current isolation within the OBCM; and
a controller programmed to control the switching state of the first and second switches via switching control signals.

20. The vehicle of claim 19, wherein the set of solid-state devices includes:
a third switch in electrical parallel with the first switch and having the same switching state as the first switch, with the first and third switches being electrically connected on respective positive and negative rails of the DC voltage bus; and
a fourth switch in electrical parallel with the second switch between the boost converter and the buck converter and having the same switching state as the second switch, with the second and fourth switches being electrically connected on the respective positive and negative rails of the DC voltage bus.

* * * * *